United States Patent [19]

Hölzl et al.

[11] Patent Number: 5,769,400
[45] Date of Patent: Jun. 23, 1998

[54] HEIGHT AND INCLINATION CONTROL OF A WAGON BODY

[75] Inventors: Stefan Hölzl; Winfried Hommen; Ralf-Christian Oberthür; Georg Stauble, all of Munich, Germany

[73] Assignee: Knorr-Bremse AG, Munich, Germany

[21] Appl. No.: 445,700

[22] PCT Filed: Oct. 13, 1993

[86] PCT No.: PCT/DE93/00980

§ 371 Date: May 22, 1995

§ 102(e) Date: May 22, 1995

[87] PCT Pub. No.: WO94/08833

PCT Pub. Date: Apr. 28, 1994

[30] Foreign Application Priority Data

Oct. 13, 1992 [DE] Germany ............................ 42 34 523.5

[51] Int. Cl.[6] .................. B60T 17/02; B60G 17/015; B61F 5/10; B61F 3/00

[52] U.S. Cl. .................. 267/64.16; 280/707; 280/708; 303/3; 105/199.2

[58] Field of Search ................ 267/64.16, 64.17, 267/64.25, 64.27, 64.23, 64.24, 64.19, 64.21, 64.11, 113, 122; 188/195, 299; 303/3; 280/714, 707, 708, 6.12, 112.2; 105/199.2, 198.1, 198.3, 198.2, 453

[56] References Cited

U.S. PATENT DOCUMENTS

| | | |
|---|---|---|
| 3,871,680 | 3/1975 | Ito et al. ................................. 285/708 |
| 3,873,123 | 3/1975 | Joneleit . |
| 3,896,740 | 7/1975 | Kreissig . |
| 4,655,440 | 4/1987 | Eckert ................................. 267/64.16 |
| 5,074,624 | 12/1991 | Stauble et al. ............................ 303/3 |
| 5,159,881 | 11/1992 | Durand et al. . |
| 5,342,023 | 8/1994 | Kuriki et al. ........................ 267/64.16 |
| 5,671,682 | 9/1997 | Holzl et al. .......................... 105/199.2 |

FOREIGN PATENT DOCUMENTS

| | | |
|---|---|---|
| 530 755A1 | 3/1993 | European Pat. Off. . |
| 4234523 | 4/1994 | Germany . |

OTHER PUBLICATIONS

Japanese Abstract from Japanese Application No. JP00063743, dated Mar. 14, 1990 for Hydraulic Pneumatic Suspension, by Hino Motors, Ltd.

Primary Examiner—Douglas C. Butler
Attorney, Agent, or Firm—Barnes & Thornburg

[57] ABSTRACT

The present invention is a process and system for controlling the wagon body of a vehicle which can be used alone or in combination with a steel spring system. The control system has comparatively small geometrical dimensions and requires relatively little energy and includes a pressure accumulator connected in parallel to delivery pump 8 of the hydraulic pressure medium. The two devices working together against the pressure of the hydropneumatic pressure accumulator of the body height system. Thus, the pressure accumulator can be charged during the travel of the vehicle so that the pump does not have to be designed according to the peak load in the case of a fast load change.

20 Claims, 6 Drawing Sheets

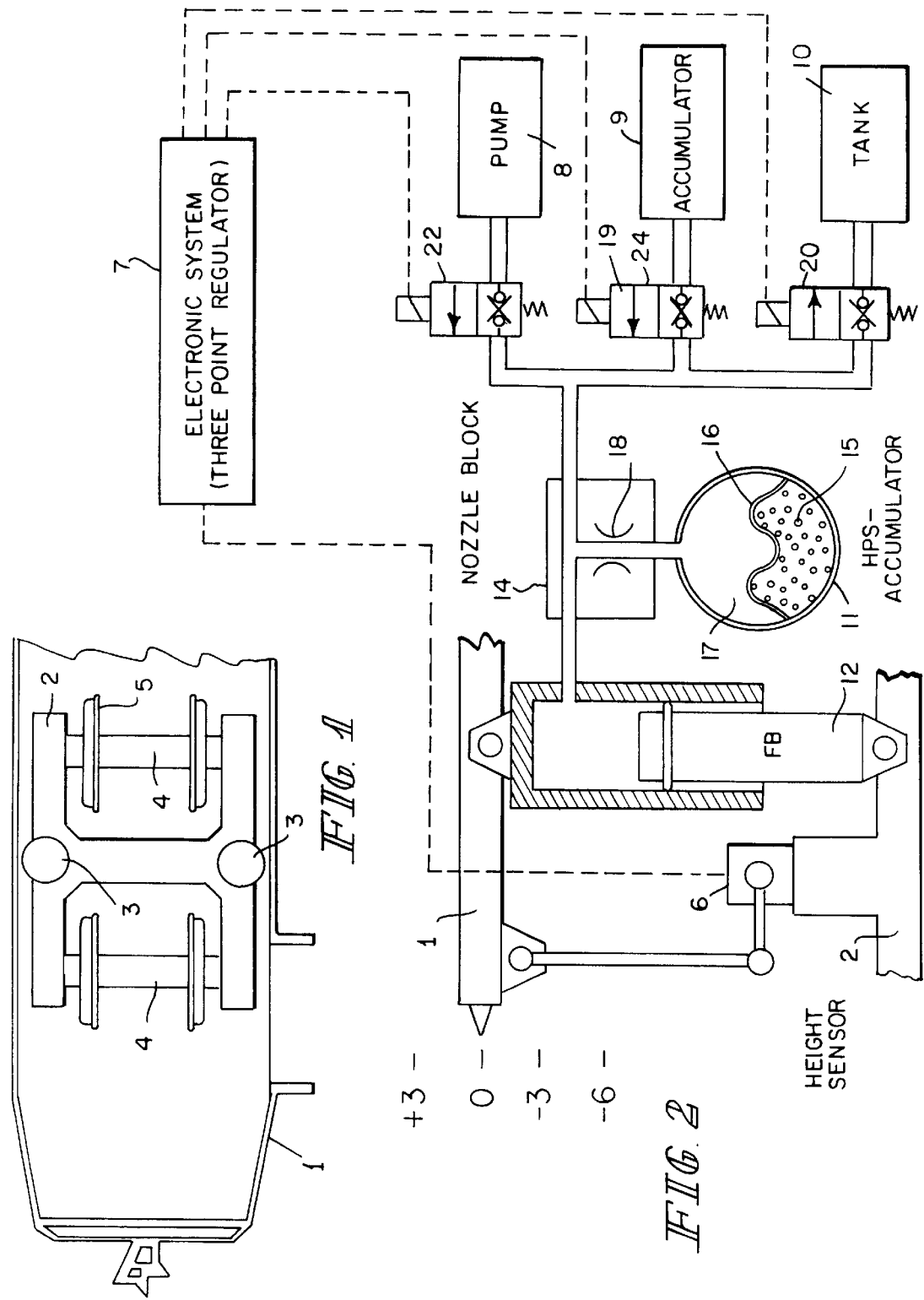

HEIGHT AND INCLINATION CONTROL OF A WAGON BODY

BACKGROUND AND SUMMARY OF THE INVENTION

The present invention relates to a height and inclination control of a wagon box, and more particularly to a wagon box of a rail vehicle, comprising a rail-borne bogie which, in addition to having steel springs, is cushioned by hydropneumatic springs or is cushioned only by hydropneumatic springs.

Hydropneumatic spring systems of this type are known from German Patent Document DE-OS 38 33 922, corresponding to U.S. Pat. No. 5,074,624. In each of its bogies, the height controlling spring system known from this document has a hydraulic pressure supply unit from which, in a mutually parallel manner, by way of pressure protection valves, the hydraulic brake as well as the hydropneumatic spring system of the respective bogies are supplied with pressure. The return flow pipes of the electrohydraulic brake and of the hydropneumatic spring system lead to an unpressurized hydraulic tank. In this case, oil volumes required for the height control are always taken from an accumulator. After it was partially emptied, this accumulator is filled up again, as required, specifically when the accumulator pressure has fallen below a predetermined value. This process has the effect that the pump must always work against a stored accumulator pressure which, however, is always above the pressure in the spring system. Thus, the energy requirements are relatively high in this type of height control so that it appears to be necessary to reduce this energy consumption.

Currently, hydropneumatic suspensions (HPS) are mainly used in motor vehicles. These HP-suspension systems normally have a mechanical height control. The pressure supply of the systems usually takes place by way of a central vehicle hydraulic system.

Up to now, hydropneumatic suspensions have been very rare in rail vehicles. In rail-borne vehicles, systems of this type must meet various requirements. Thus, the HP-spring system must be able to master a relatively large ratio of vehicle weights (loaded/empty of approximately 1.5 to 3). In addition, in the case of a change of passengers at stops, the vehicle height must be held approximately constant. This makes high demands on the speed of the height regulator. In addition, large amounts of oil must be fed into the hydraulic loops within a short time and must be drained from them within a short time. In addition, the influences of the dynamics of the vehicle movement must be recognized by the regulator in order to prevent a response to the regulator, for example, during spring movements or cornering.

The energy consumption of the overall system should therefore be relatively low in order to, on the one hand, minimize the size of the hydro-equipment and, on the other hand, be able to supply the whole system from the battery.

It is therefore an object of the present invention to move large quantities of oil in the hydraulic loops within a relatively short time; in which case the energy consumption of the overall system is as low as possible and the size of the hydro-equipment is therefore small.

According to the invention, this object is achieved in a system for the control of the height and the inclination of a wagon body for vehicles, particularly rail vehicles, having at least one hydropneumatically controlled suspension damping system which comprises sensors which sense the height as well as the inclination of the wagon body, and the signals of the sensors are fed to an electric control system also pump which operates directly against the pressure ($p_{HPS}$) of an HPS-pressure accumulator of the suspension damping system and pressure medium is removed from the accumulator, filled during the travel only, when the delivery volume of the pump is not sufficient for keeping the height of the wagon body constant.

The arrangement developed according to this process of the invention is characterized in that it has at least one spring strut which causes the vertical height control; and has another device which determines the horizontal position of the wagon body;

has a pump which is arranged in parallel to a supply accumulator; and supply the pump and the accumulator are arranged such that they operate against an HP-accumulator which is known per se.

Additional advantageous further developments of the invention are found in the subclaims.

The approach taken according to the present invention consists of several assemblies, such as the spring strut (FB) and the HPS-pressure accumulator with a restriction. The assemblies carry out the function of the "springing of the wagon body" as well as the function of the "damping of the spring movement".

On the top, the spring strut is fastened on the wagon body and, on the bottom, it is connected to the bogie or to the running gear. During a spring movement, the piston in the spring strut displaces a specific oil volume. This oil volume operates against a gas cushion in the HPS-accumulator connected with the spring strut. The gas is separated from the oil volume by means of a membrane and is used as an elastic element. The hydraulic fluid takes over the function of a transmission of movements. In principle, this arrangement is well known in the prior art.

The vehicle vibrations, that is, the vibrations of the wagon body, are called pitching vibrations and are damped by means of the nozzles or one nozzle accommodated in the nozzle block.

One height sensor exists for each HPS-loop. This height sensor reports the height of the wagon body in the area of the respectively considered HPS-loop to the electronic control system. In the case of an excessive deviation of the median wagon body height from the desired height, this electronic control system controls the hydraulic valves housed in the hydro-equipment in such a manner that the oil quantity required for compensating the height is fed either by the pump or by the pump and the pressure accumulator to the HPS-accumulators or is discharged from the HPS-accumulators into the tank. For ensuring the height control function, a separate three-point controller is advantageously assigned to each HP-spring loop in the electronic control system.

An HPS or control loop of the above-mentioned type exists several times in the vehicle, the number of systems depending on the constructive design of the vehicle. It is therefore possible to control the height of the vehicle independently at three freely selectable points. In this case, it may be useful to combine several spring struts to form a common suspension or height control system.

The method of operation in the case of a process according to the invention is as follows: When the load increases, the gas volume in the HPS-accumulator is compressed. When there is no height control, this would result in a lowering of the wagon body. In order to avoid this lowering, the reduction of the gas volume must be compensated by the feeding of a corresponding amount of hydraulic fluid. In contrast, when the vehicle load is reduced (gas expands in the HPS-accumulator), the enlargement of the gas volume must be compensated by the drawing of hydraulic liquid from the system.

The logic implemented in the electronic height system basically differentiates between two different operating conditions, such as stoppage of the vehicle at the stop during which the doors are released to be opened and during which a load change may take place, as well as the travel operation during which, as a rule, no change of passengers will take place. According to the method of operation, the height control will react differently to the signals of the height sensors.

Corresponding to this control logic, according to the invention, the oil consumption of the system is minimized. As a result, the installed pump and engine outputs and the sizes of the hydro-equipment may be kept small.

In the following, the present invention will be explained in detail with reference to the drawings.

BRIEF DESCRIPTION OF THE DRAWINGS

FIG. 1 is a basic diagram of a top view of the secondary spring system of a bogie;

FIG. 2 is a diagramatic view of the basic construction of a loop of the HP-spring system;

DETAILED DESCRIPTION OF THE PREFERRED EMBODIMENTS

Figure 3:
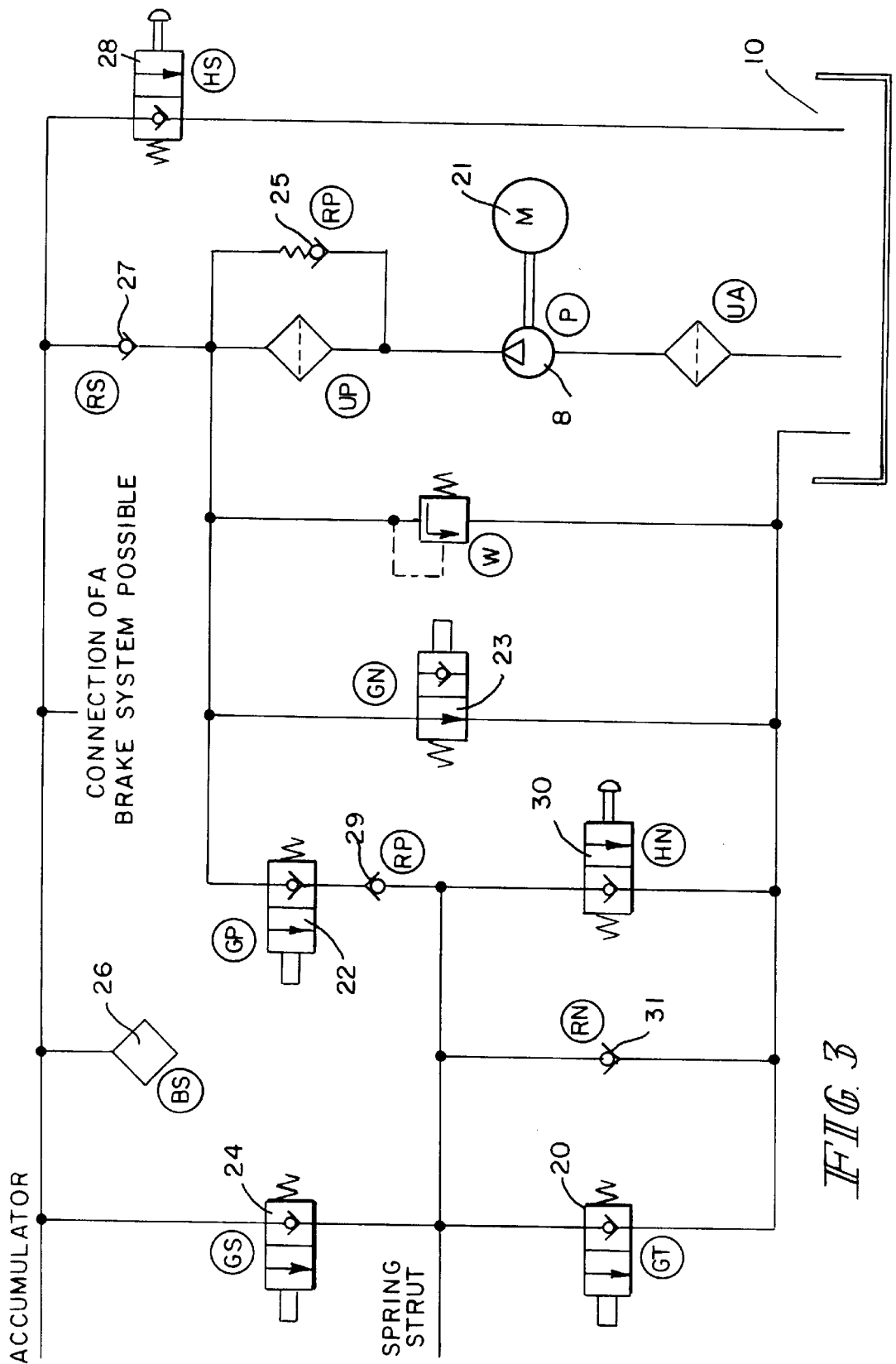
FIG. 3 is a fluid schematic of an HP-spring system according to the invention.

FIG. 1 is a basic diagram of a top view of a secondary spring system of a bogie. The wagon body 1 is situated above the running gear 2 which in the present case consists of two wheel sets 4 with two wheels 5 respectively. The wheel sets 4 are fixedly connected with one another by two carriers. The elements which are of interest for the present invention are the spring systems 3 which, in this case, are arranged in the center of the running gear 2. The hydropneumatic spring system according to the invention may be installed as a secondary spring system in rail vehicles and is suitable as a replacement of conventional steel and pneumatic spring systems. It is superior to the steel spring with respect to travelling comfort and because a constant vehicle height is ensured. With respect to the pneumatic spring system, it has advantages with respect to the space requirement, the control speed and because of the fact that, when an electro-hydraulic brake is used, no second pressure medium is required. Another advantage is the fact that, in the case of the embodiment according to the invention, under certain circumstances, the vertically and horizontally acting dampers may be omitted. In principle, the hydropneumatic spring system is implemented by one or two spring struts (FB) per side, to which steel springs may under certain circumstances be connected in parallel. The spring struts 12 (FIG. 2) are coupled with one another so that the left spring system is hydraulically connected with the right spring system 3.

A construction of the spring system 3 would also be conceivable in such a manner that each vehicle side has an independent hydraulic loop so that the right spring system is hydraulically separated from the left spring system. In principle, the spring system 3 is a system which may influence the position of the wagon body 1 in the vertical as well as in the horizontal direction. When the influence is horizontal, a transverse spring device is integrated or additionally mounted in the vertically acting spring strut 12.

The operating principle of a hydropneumatic spring system according to the invention is schematically illustrated in FIG. 2. The spring system consists of the assemblies spring strut 12 (FB) and HPS-pressure accumulator 11 with a restriction block 14 arranged above it. These assemblies carry out the function of the suspension of the wagon body 1 but also the function of the damping of the spring movements.

On the top, the spring strut 12 is fastened to the wagon body 1, and on the bottom to the bogie 2 or to the running gear. In the case of this spring movement, the piston in the spring strut displaces a certain oil volume. In the HPS-pressure accumulator 11 connected with the spring strut, this oil volume operates against a gas cushion 15 which is separated by a membrane 16 from the oil volume 17 and is therefore used as an elastic element. Thus the hydraulic fluid transmits the force transmission. The vehicle vibrations (wagon body pitching vibrations) are damped by the restriction 18 housed in the nozzle block 14.

One height sensor 6 is provided for each HPS-loop. This height sensor 6 reports the height of the wagon body 1 in the area of the respective considered HPS-loop to the electronic control system 7. When the deviation of the median wagon body height from the desired height is excessive, this electronic control system 7 controls the hydraulic valves housed in the hydro-equipment in such a that the oil quantity required for the height compensation is either fed by a pump or a pump 8 and a pressure accumulator 9 to the HPS-pressure accumulators 11, or is discharged from the HPS-pressure accumulator into a tank 10. For ensuring the height control function, a separate three-point regulator is assigned to each HP spring loop in the electronic control system.

An HPS-control loop of the above-mentioned type exists in the vehicle, in which case the number of loops should depend on the constructive design of the vehicle. It is therefore possible to control the height of the wagon body 1 at three freely selectable points independently of one another. In this case, it may be useful to combine several spring struts to form a common spring or height control loop.

In the following, the general method of operation of the height control will now be explained in detail. When the load increases, the gas volume 15 in the HPS-accumulators 11 is compressed. Without any height control, this would result in a lowering of the wagon body 1. In order to avoid this lowering, the reduction of the gas volume must be compensated by the feeding of a corresponding amount of hydraulic fluid 17. In contrast, when the vehicle load is decreased (gas expands in the HPS-accumulator), the enlargement of the gas volume must be compensated by draining hydraulic fluid 17 from the loop.

The logic implemented in the electronic height control system 7 basically differentiates between two different operating conditions. The first operating condition is the stoppage of the vehicle at the stop during which the doors are released to be opened and during which a load change may take place. The second operating condition is the travelling operation during which no passenger change takes place. Depending on the operating condition, the height control reacts differently to the signal of the height sensor 6. The controlling of height changes during the stoppage takes place constantly and without time delay. This means that the vehicle height will also remain approximately constant when passengers enter or leave the vehicle at a stop.

As a rule, the system is designed such that the wagon body 1, also during a load change from empty to fully loaded, which takes place in approximately 30 seconds, is not temporarily lowered by more than approximately 6 mm.

During the stoppage, the height control differentiates between the following load changing operations. When the load increase takes place slowly, that is, when, during the considered time period, only a few passengers enter the vehicle, the oil quantity 17 required to maintain the height is made available by the hydraulic pump 8 via valve 22. This pump is housed in the hydro-apparatus of the supply part and is driven by an electric motor which is not shown as soon as, during the stoppage of the vehicle at the stop, a lowering of the wagon body by more than approximately $\Delta X=3$ mm is recorded.

When the load increase takes place faster, that is, when many passengers enter the vehicle within a short time at a stop, as a rule, the pump delivery output alone will no longer be sufficient for keeping the vehicle at the desired height. In this case, the lacking oil volume is obtained from the pressure accumulator 9 by valve 19, 27. This connection of the pressure accumulator 9 will take place when the wagon body 1 at the stop was lowered by approximately 6 mm.

When the load is reduced, that is, when passengers leave the vehicle, a specific oil volume is drained from the HPS-accumulators 11 into the tank 10 of a hydro-apparatus by a valve 20 as soon as the wagon body 1 is raised by more than approximately 3 mm above the normal height.

Because the pressure accumulator 9 is connected only when load changes take place fast, the accumulator volume may be kept relatively low. The pump 8, the accumulator 9 and the tank 10 are connected with one another in the hydro-apparatus.

Between the stops, the accumulator is filled up again by the pump 8. A relatively large time period is therefore available to the pump 8 for this operation. This permits the use of motor-pump combinations which have a low requirement with respect to electric power.

During the travel, the median vehicle height can be monitored continuously. A compensation operation during the travel takes place only when an unacceptably high deviation of the median actual height from the desired height of the vehicle is recorded. The computing of a median actual height prevents the control from the attempt to compensate for the dynamic height change of the vehicle when travelling over unevennesses in the rail.

Movements of the wagon body 1, which are caused during cornering, braking and starting or because of wind pressure, are compensated or controlled by the strut 12 and possibly by an additional transverse spring device which is arranged either in the spring strut 12 or outside this spring strut 12.

One example of the technical implementation of an HPS-loop is illustrated schematically in FIG. 3 by a hydraulic wiring diagram. If the wagon body 1, during a stoppage, moves upward by more than 3 mm from the zero position, the drain valve (GT) 20 is opened up and is held in this position until the wagon body 1 has lowered to the +3 mm limit again.

When the wagon body 1 is in a tolerance field of +3 mm about the ideal desired height of the vehicle, all valves and the motor (M) 21 remain currentless. An exception is made when the motor is already running in this condition. In this case, the motor will switch off with a time delay of approximately 15 seconds.

Another condition exists when the wagon body 1 is lowered from the desired height by more than 3 mm but still remains within the 6 mm limit. In this case, the motor 21 is switched on, the short-circuit or bypass valve (GN) 23 is closed and the valve (GP) 22 is opened. The pump 8 will then deliver oil by way of the valve (GP) 22 into the spring loop and attempts to bring the height back into the 3 mm tolerance field about the desired wagon body position.

Another condition will occur when the wagon body 1 was lowered by more than 6 mm from the zero height because the pump delivery output was not sufficient to compensate the increase in load. In this case, in addition to valve (GP) 22, valve (GS) 24 also opens up in order to feed oil volume from the accumulator 9 into the springing loop. Valve (GS) 24 will close as soon as the wagon body 1 is raised again to a height of 6 mm under the zero position.

During the travel operation, by means of a suitable algorithm, the median vehicle height can be determined during the travel. This median vehicle height is used as an input quantity and the control operation will then take place according to the diagram which follows.

The computing of a median actual height prevents the control from the attempt to compensate dynamic height changes of the vehicle when travelling over unevennesses on the rail, as mentioned above. However, quasi-static height changes because of leakage rates or because of thermal influences can be controlled.

In contrast to the control during a stoppage, during the travel, the regulator uses only a "window" which is determined by a deviation from the desired height of the wagon body in the upward and downward direction of 6 mm respectively.

If the actuating of a valve becomes necessary during the travel, this valve is opened up for a defined time period (for example, 100 ms). A closing of the valves as a function of the exact momentary height, as in the case of the control during a stoppage, does not take place in this case.

It should also be taken into account that, during the travel, the logic for the height control does not control the motor 21, the pump valve (GP) 22 and the short-circuit valve (GN) 23. The control of the oil quantity 17 in the spring struts 12 takes place exclusively by the outlet valve (GT) 20 and the accumulator valve (GS) 24. In the driving operation, the pump motor 21 is therefore not influenced by the signals of the height sensors but will start only when this is demanded by the accumulator pressure monitoring system.

A long-lasting cornering presents a special problem during the travelling operation. The control logic must be able to detect this cornering in order to avoid that, in the case of a rolling motion occurring in the curve, a height difference between the right and the left vehicle side is recorded and controlled. This would result in an inclined position of the vehicle after the end of the cornering.

In contrast, naturally, a quasi-static one-sided lowering or lifting of the vehicle must be recognized and corrected.

The control logic differentiates between the two operations in the following manner: If, after the expiration of the time cycle (for example, 10 seconds), a height difference between the right and the left vehicle side is recognized, the measurement is first ignored and it is assumed that a cornering took place.

If, however, after the expiration of another time cycle, the desired height does not yet exist again on both sides of the vehicle, this height deviation is compensated by the control.

The change-over between the stoppage and travel control may be viewed, for example, as a function of the signal of the blocking brake. If the blocking brake is engaged, the vehicle height is corrected according to the logic for the stoppage control, in which case, when the blocking brake is disengaged, the electronic system is controlled according to the logic for the travel. It is also possible to use the absolute driving speed of the vehicle as a criterion. The other operating elements disposed in the circuit are the a pressure sensor (BS) 26 which feeds the accumulator pressure to the electronic control system; a return valve (RS) 27 which prevents the emptying of the accumulator 9 in the case of a stopped motor 21 but permits the filling of the accumulator if the valves (GP) 22 and (GN) 23 are closed. Furthermore, a manual valve (HS) 28 permits the draining of the accumulator pressure, for example, for maintenance work, and the return valve (RP) 29 prevents the pressure loss of the HPS-loop when the motor 21 is stopped. A manual valve HN 30 permits the draining of the pressure in the HPS-loop, for example, for maintenance work, and a return valve RN 31 permits the taking-in of oil from the unpressurized tank 10. The symbols (UP) and (UA) represent only filters, while W is a pressure protection valve. The return valve 25 becomes operative when the filter (UP) is clogged.

Furthermore, other possible additional functions, which, for example, permit the implementation of a so-called kneeling function, can be carried out.

Special attention must be paid in the case of rail vehicles to the suspension in the transverse direction, that is, in the horizontal plane. The devices, which are used for the transverse suspension, may be either combined with the vertical springing or may be separate from it, as mentioned above.

An example for a combined vertical and transverse suspension is the pneumatic spring or a steel spring which uses the "flexi-float principle". In contrast, when a cradle float with steel springs is used, the transverse suspension is implemented by the floats, the vertical suspension is implemented by the steel springs. In the case of the hydropneumatic suspension, both variants are possible.

Figure 6:
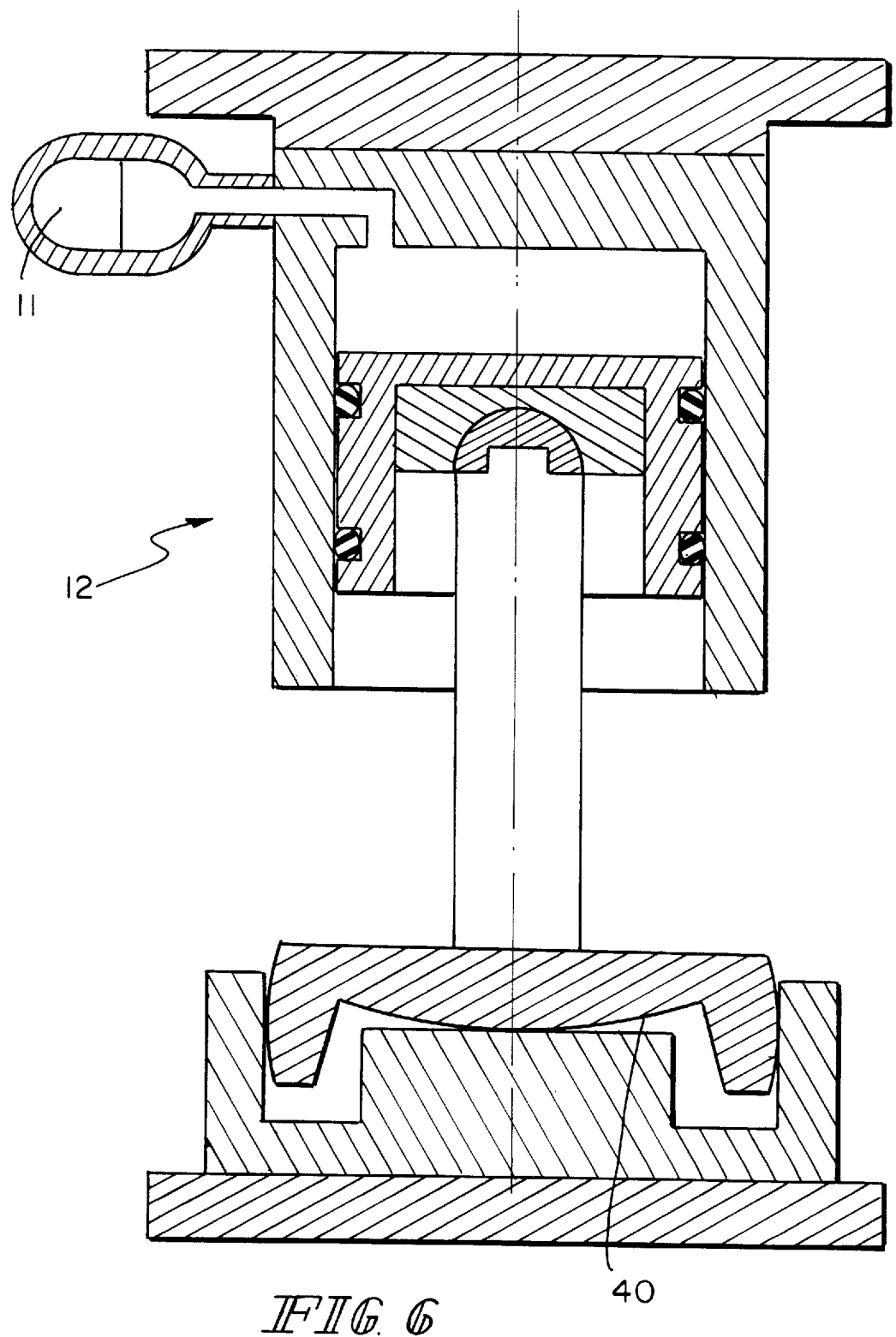
FIG. 6 is a cross sectional view of a transverse spring integrated in a vertically operative spring strut.

If the transverse spring is integrated in the spring strut 12 as shown in FIG. 6, this transverse spring is implemented by a restoring device in the lower bearing of the spring strut. In this case, this lower bearing consists of a ball 40 whose center is situated above the point of application of the wagon body weight, thus above the upper bearing of the spring strut.

Figure 7:
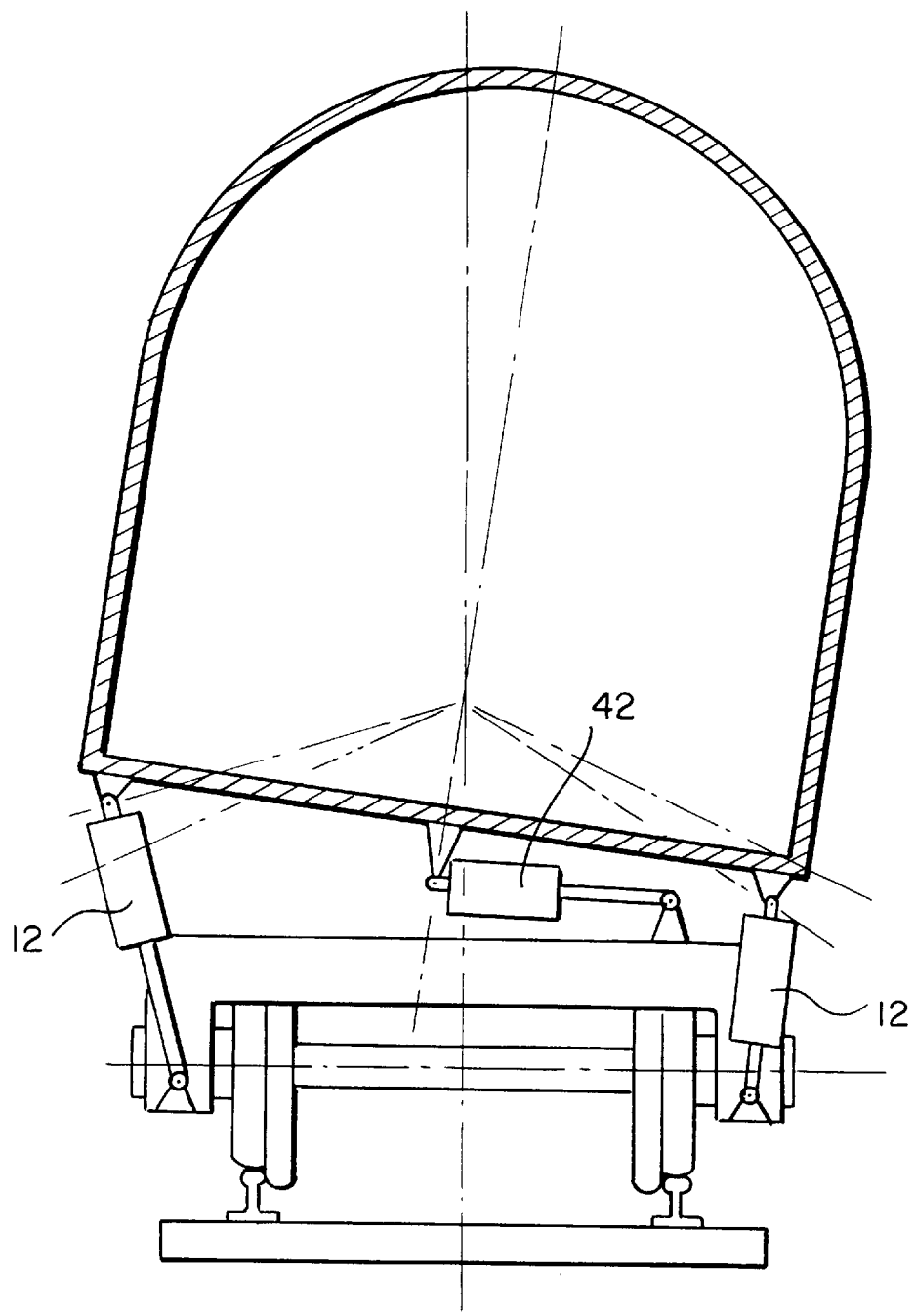
FIG. 7 is an end view of a transverse suspension external a vertically operative spring strut.

If the transverse suspension is arranged externally as illustrated in FIG. 7, in addition to the vertically operative spring strut, an essentially horizontally arranged spring strut 42 is used. The construction of this spring strut is similar to the above-described vertical spring strut 12. In addition, a horizontal compensation can also be carried out by a passive spring element, such as a pneumatic or steel spring.

The control of the horizontal position of the wagon body takes place by a position control loop which is controlled in the same manner as the vertical height control illustrated in FIG. 2. The transverse spring strut may be used for additional functions, as, for example, for the lateral pressing of the wagon body against the curb. A combination of an internal and an external transverse suspension is also conceivable.

By a sensor or directly by the corresponding contacts of the travel and brake control, it can be determined whether the vehicle is accelerated or braked. Because of this information, the height control can be controlled such that the dipping of the vehicle during starting or braking operations is compensated. Thus, the height control is expanded into a wagon body inclination control. During fast cornering, in which there is no sufficient banking or no banking at all, this arrangement inclines the wagon body 1 by a certain amount to the inside of the curb. The wagon body inclination is dimensioned such that passengers do not notice the effect of the centrifugal force. This function is implemented by the existing structural elements. Only the logic of the implemented software must be supplemented.

Figure 8:
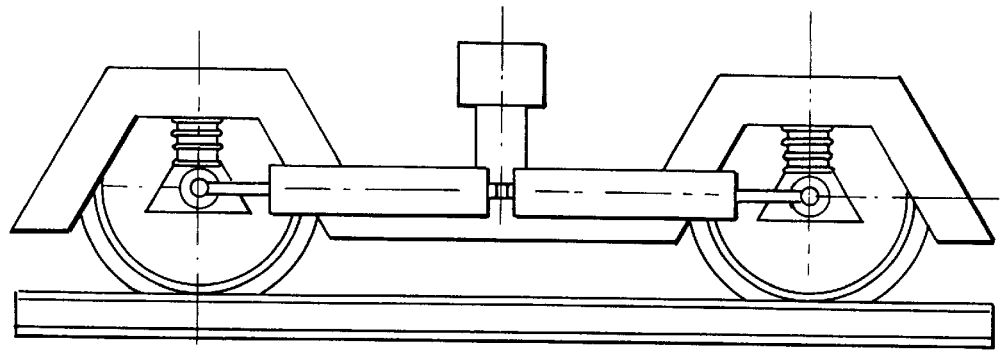
FIGS. 8 and 9 are side and plan view of fluid struts and a controlled unit for radial adjustment of the wheel set.
Figure 9:
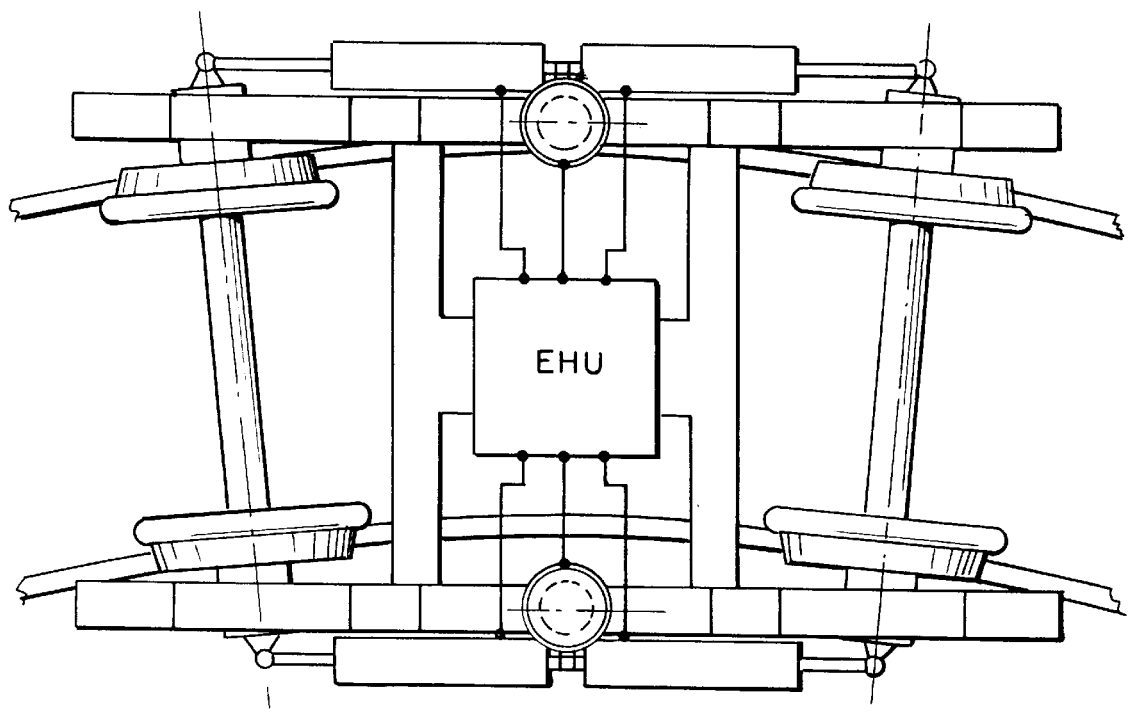

In addition, the hydropneumatic suspension in the above-described wagon body inclination control can be combined with a radial adjustment of the wheel sets as a function of the driving speed and the pressure difference between the spring strut 12 on the inside and outside of the curve. This includes fluid struts 44 and control unit EHU as illustrated in FIGS. 8 and 9. Thus the angle of approach of the wheel flange on the rail becomes smaller, whereby the wear and the noise can be reduced.

During travel, the height adjustment of the wagon body 1 is to be carried out on the basis of the height information of the platform sensors or by way of an IBIS (Integrated Board Info System).

Figure 4:
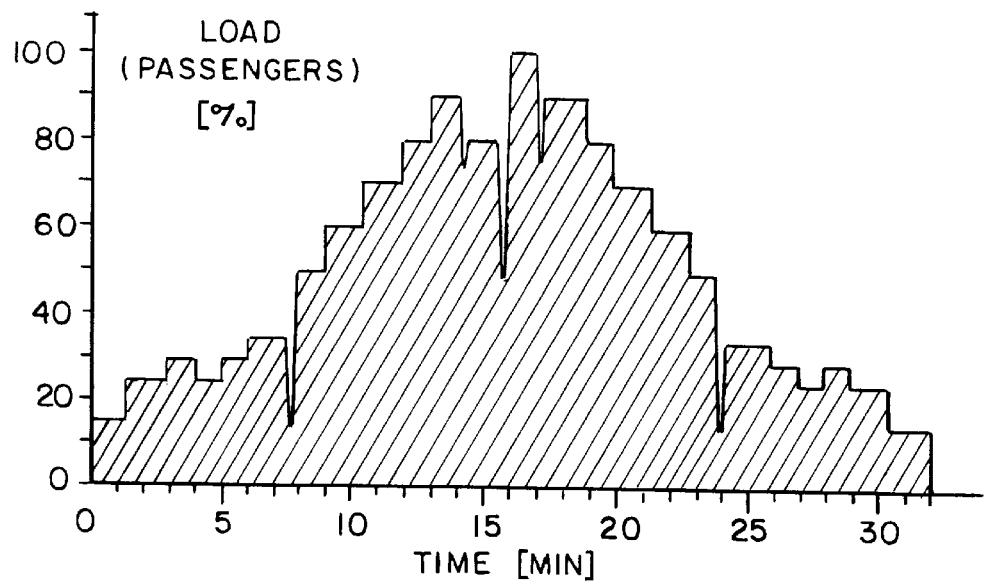
FIG. 4 is a graph of a possible time-dependent load profile of the wagon body 1.

FIG. 4 shows an example of a predetermined load profile of the vehicle. This diagram shows, in the vertical direction, the load of the passengers in percent and, in the horizontal direction, the time in minutes. The "peaks" which occur during possible load changes characterize stops at which a large number of passengers leave the vehicle but immediately afterwards, many passengers also enter the vehicle. Since, also in this situation, the vehicle height is to be approximately held, a large quantity must first be drained here from the HPS-accumulator 11 and must then immediately be fed again. Therefore, such stops signify an increased load for the system.

Figure 5:
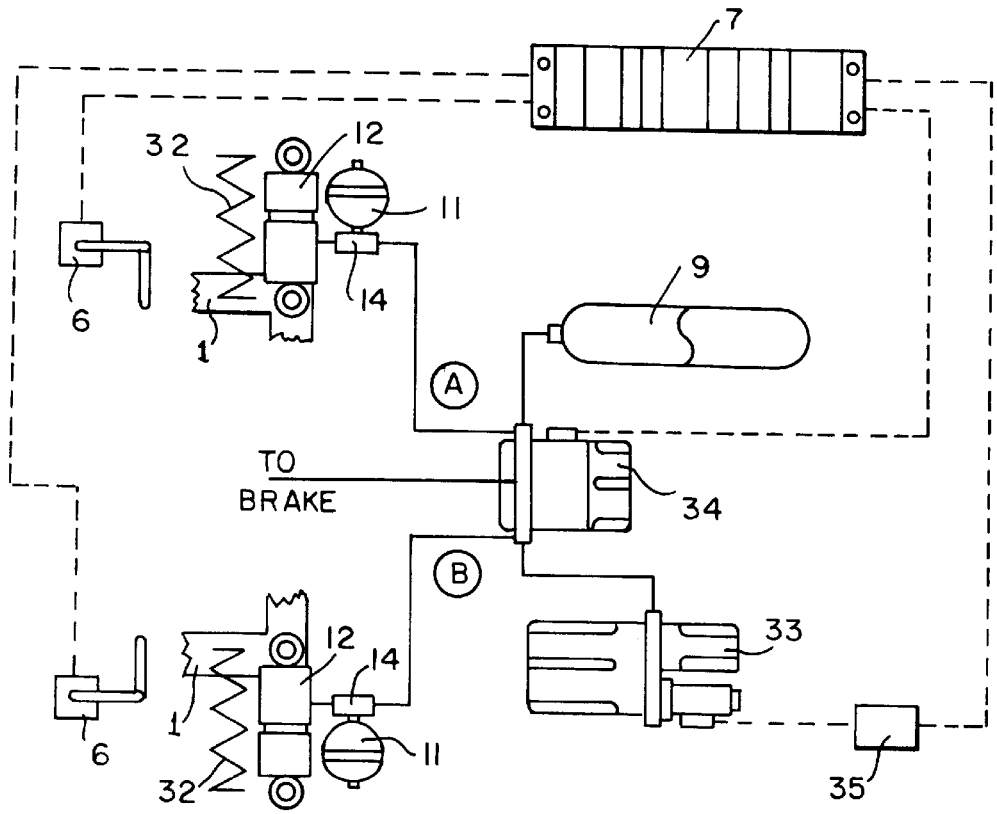
FIG. 5 is a diagramatic view of an embodiment according to the invention for equipping a bogie or a running gear with a hydropneumatic spring system and an electrohydraulic brake.

FIG. 5 is a schematic representation of an example of a bogie mounting. In the example illustrated in FIG. 5, two independent spring or height control loops (A) and (B) are implemented which both have their own height sensor 6. A spring strut 12 with the pertaining HPS-accumulator and the restriction block 14 is connected to each HPS-loop. The system is partially supporting. One parallel-connected steel spring 32 exists for each spring strut 1.

For the pressure supply and the control of the system, two hydro-apparatuses are used, the supply unit 33 and the control unit 34, which may also be combined into one unit. In addition to the two HPS-loops, a pressure accumulator 9 is connected to the control unit 34. In addition, the control unit 34 feeds the brake system which is not shown in detail. Furthermore, a separation of the equipment between the spring unit and the brake unit is also possible. For controlling the system, an electronic control unit 7 is used which receives the height sensor signals, analyzes them and controls the two hydro-units 33 and 34. The control of the motor in the supply unit 33 takes place by a motor contactor 35.

We claim:

1. Process for controlling height and inclination of a wagon body for vehicles, having at least one hydropneumatically controlled suspension—damping system which includes a hydropneumatic suspension accumulator, a hydraulic spring strut, a pump, a supply accumulator for a pressure medium, sensors sensing height and inclination of the wagon body and signals of the sensors being fed to an electronic control unit, the process comprising operating the pump to work directly against the hydropneumatic pressure of the hydropneumatic suspension accumulator and pressure medium is removed from the supply accumulator only when delivery volume of the pump is not sufficient for keeping the height of the wagon body constant.

2. Process according to claim 1, characterized in that, when the height of the wagon body is within a first and second threshold value, feeding the spring strut and the hydropneumatic suspension accumulator only by the pump.

3. Process according to claim 2, characterized in that, when the second threshold value, which is larger than the first threshold value, of the height of the wagon body is exceeded, feeding the spring strut and the hydropneumatic suspension-accumulator by the pump and the supply accumulator.

4. Process according to claim 1, characterized in that, after a control operation at a stop of the vehicle, when a load is unchanged, switching the pump to idling by a bypass valve.

5. Process according to claim 1, characterized in that filling up of the supply accumulator by a return valve during travel.

6. Process according to claim 1, characterized in that, for change-over between a "fill HPS-loop" condition and a "accumulator filling" condition, using only a magnetic valve to connect and disconnect the pump from the HPS-loop.

7. Process according to claim 1, characterized in that, for change-over from "idling" to "accumulator" or "HPS-loop filling", using a valve to disconnect an output of the pump from a tank.

8. Process according to claim 1, characterized in that, during travel, using the control unit to determine a median vehicle height in such a manner that the influences of dynamics of vehicle movement exercise no influence on the control operation.

9. Process according to claim 1, characterized in that integrating a transverse suspension into a vertically operative spring strut.

10. Process according to claim 9, characterized in that providing an additional horizontally operative spring strut.

11. Process according to claim 10, characterized in that the transverse suspension comprises a combination of the integrated and the additional spring strut for the transverse suspension.

12. Process according to claim 9, characterized in that providing two control loops for horizontal and vertical positioning of the wagon body.

13. Process according to claim 1, characterized in that using a sensor to sense acceleration and braking operations and feed the signal to the electronic control unit.

14. Process according to claim 9, characterized in that providing a wagon body inclination control combined with a radial adjustment of wheel sets.

15. Process according to claim 9, characterized in that connecting an additional hydropneumatic suspension accumulator to the system in order to adapt the suspension to traveling speed.

16. Arrangement for controlling height of a wagon body of a vehicle including at least one hydropneumatically controlled suspension-damping system comprising a sensor which senses height of the wagon body and feeds signals of the sensor to an electronic control unit, a hydropneumatic suspension accumulator, at least one supply accumulator for a pressure medium, at least one spring strut which causes vertical height control and is connected to the hydropneumatic suspension accumulator, a pump in parallel to the supply accumulator, and valves controlled by the control unit for selectively connecting the pump and the supply accumulator to the spring strut to work against the hydropneumatic pressure of the hydropneumatic suspension accumulator.

17. Arrangement according to claim 16, characterized in that a plurality of sensors are provided to sense the inclination of the wagon and the electronic control unit consists of a three-point regulator.

18. Arrangement according to claim 16, characterized in that the hydropneumatic suspension damping system is combined with an electro-pneumatic (EP)-system of a brake system of the vehicle.

19. Arrangement according to claim 16, characterized in that the control unit connects the pump only to the spring strut for values of wagon body heights between a first and second threshold value and connects both the pump and the supply accumulator to the spring strut for values of wagon body heights larger than the second threshold value.

20. Arrangement according to claim 16 characterized in that the control unit connects the pump and supply accumulator to the spring strut only when the vehicle is stopped.

* * * * *